Oct. 5, 1965
C. A. BOYD
3,209,864
SINGLE SHOT ENERGY DISSIPATOR
Filed Oct. 6, 1964
2 Sheets-Sheet 1
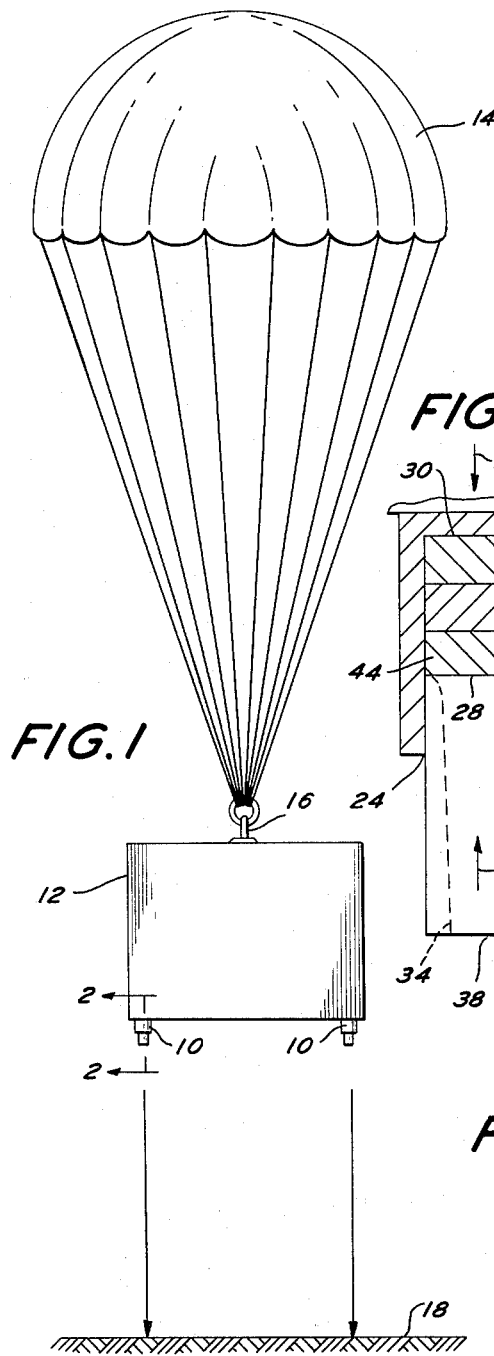
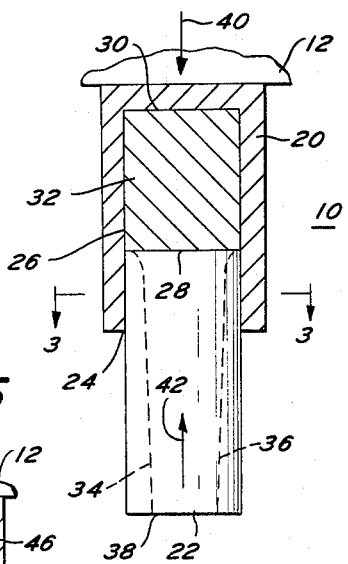
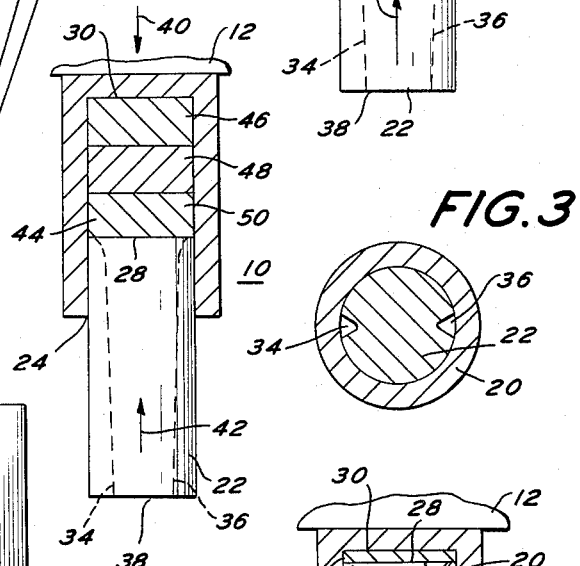
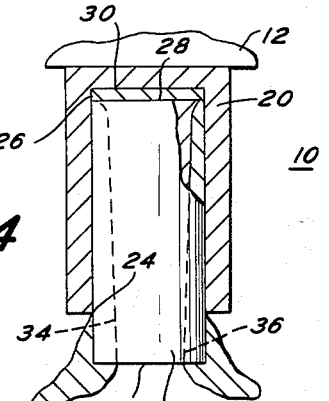
INVENTOR.
CHARLES A. BOYD
BY Arthur H. Seidel
ATTORNEY

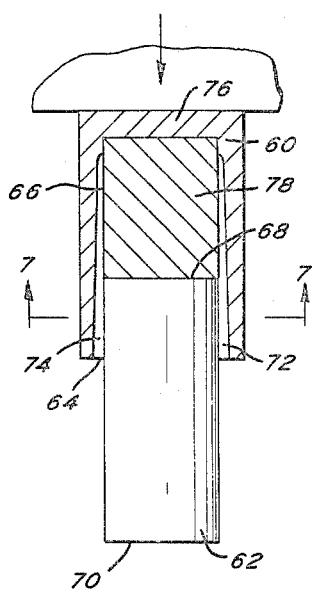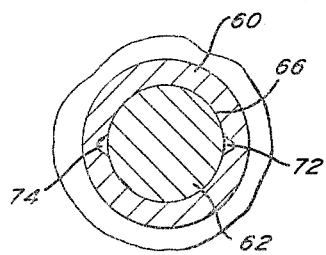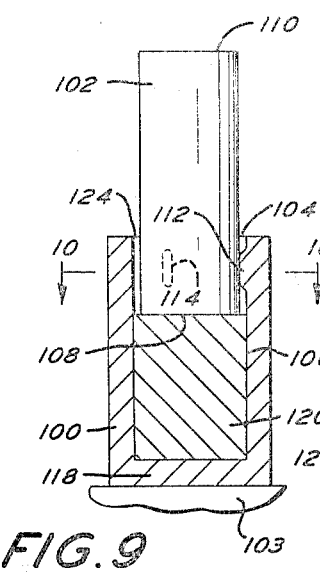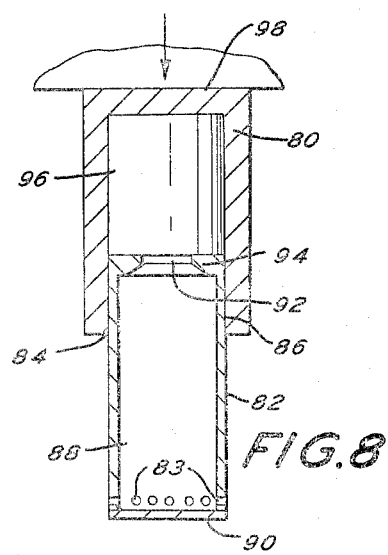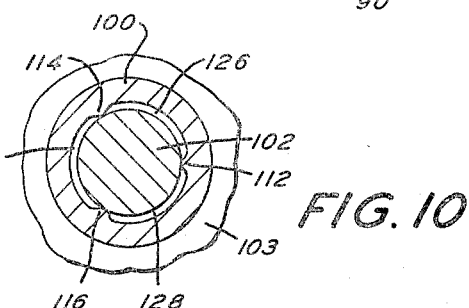

United States Patent Office 3,209,864
Patented Oct. 5, 1965

3,209,864
SINGLE SHOT ENERGY DISSIPATOR
Charles A. Boyd, West Chester, Pa., assignor to Aeroprojects Incorporated, West Chester, Pa., a corporation of Pennsylvania
Filed Oct. 6, 1964, Ser. No. 404,551
16 Claims. (Cl. 188—1)

This application is a continuation-in-part of copending application Ser. No. 313,038, filed Oct. 1, 1963.

This invention relates to a new and improved single shot energy dissipator, and more particularly to a single shot energy dissipator capable of providing controlled deceleration for masses.

Controllable absorption of kinetic energy is needed in many applications, for purposes of providing a tolerable deceleration in order to reduce the impact of sudden stops, especially with respect to the stopping of high masses. Thus, in connection wtih the soft landing of space vehicles, for example, the landing capsule may be slowed by means of retro rockets but the final landing velocity is difficult to control precisely and adequately. Similar problems exist in other applications, such as the shock mounting of flight recording apparatus used to monitor aircraft crashes, parachute drop packages, elevator drop stops, chain and cable time delay fuses, automobile bumper supports, and tiedown elements for freight in railroad cars and trucks.

The present invention provides a single shot energy dissipator which is not only versatile but also expendable, being readily tailorable according to the desired application and effect (as, for example, according to the reliability and lightness of weight considered appropriate in a particular instance), while it is also simple and inexpensive to design and manufacture for one-time or non-reusable use.

Accordingly, it is the general object of this invention to provide a new and improved single shot energy dissipator.

Another object of this invention is to provide a single shot energy dissipator capable of producing controlled deceleration.

Still another object of this invention is the provision of a single shot energy dissipator which is simple to design and inexpensive to manufacture.

Other objects will appear hereinafter.

For the purpose of illustrating the invention, there are shown in the drawings forms which are presently preferred; it being understood, however, that this invention is not limited to the precise arrangement and instrumentalities shown.

FIGURE 1 is a showing of the single shot energy dissipator of the present invention utilized for parachute drops.

FIGURE 2 is a cross-sectional view of a single shot energy dissipator shown in FIGURE 1 taken along lines 2—2.

FIGURE 3 is a cross-sectional view taken along lines 3—3 of FIGURE 2.

FIGURE 4 is a cross-sectional view similar to FIGURE 2 after landing of the article shown in FIGURE 1.

FIGURE 5 is a cross-sectional view of a second embodiment of the present invention similar to that shown in FIGURE 2.

FIGURE 6 is a cross-sectional view of a third embodiment of the present invention.

FIGURE 7 is a transverse sectional view of the embodiment shown in FIGURE 6 taken along the line 7—7.

FIGURE 8 is a cross-sectional view of a fourth embodiment of the present invention.

FIGURE 9 is a cross-sectional view of a fifth embodiment of the present invention.

FIGURE 10 is a transverse sectional view of the embodiment shown in FIGURE 9 taken along the line 10—10.

In FIGURE 1, there is shown the single shot energy dissipator 10 of the present invention utilized with a parachute drop article.

A plurality of single shot energy dissipators 10 are provided on the bottom surface of an article 12 which is landed by means of a parachute 14 connected to the upper surface of article 12 through a suitable coupling 16.

The single shot energy dissipators 10 are placed on or in the bottom of the article 12 in order to dissipate the kinetic energy of the article 12 when it hits the ground surface 18.

Each of the dissipators 10 includes an inverted cup-shaped container 20 which has a piston strut slidably received within the open end 24 thereof. The container 20 and the strut 22 may be made of an appropriate material for extrusion device purposes, such as a carbon steel or other like metal.

The piston strut 22 has an outer diameter substantially equal to or slightly less than the diameter of the cavity 26 of the container 20. The strut 22 has an upper face 28 and a free end 38, as well as a pair of parallel peripherally spaced grooves 34 and 36 running the length of the strut 22. The grooves 34 and 36 are deeper at the free end 38 of the piston strut 22 than at the upper face 28. Thus, the grooves 34 and 36 taper inwardly toward the axis of the piston strut 22 from its upper face 28 toward its free end 38 so as to increase the area defined by these grooves.

Within the cavity 26 between the upper face 28 of the strut 22 and the back wall 30 of the cavity 26 there is provided an extrudable mass of material 32. For example, the material 32 can be a billet of soft aluminum.

While the present invention is shown and described in connection with a piston strut 22 having a flat face 28, it will be appreciated by those skilled in the art that, in order for example to obtain improved flow characteristics of the extrudable material 32, face 28 may have a different geometry such as a pointed face. Also, the free end 38 of strut 22 may have a geometry other than flat-faced, as for purposes of penetrating the ground surface 18, although this latter geometry for free end 38 is not ordinarily preferred for best operation of dissipator 10.

Thus, the inverted cup-shaped container 20 in this embodiment is connected to the body 12 whose deceleration is to be precisely controlled, and the force produced by the decelerating body 12 acts in the direction of the arrow 40, whereas the force produced by impact is transmitted by the piston strut 22 as shown by the arrow 42.

In operation, the landing force is transmitted to the billet 32 by the piston strut 22, and the kinetic energy of the descending article 12 is dissipated in the form of the work required to extrude the material 32 through the grooves 34 and 36.

A particular advantage of the present invention is that the curve of extrusion force with respect to piston travel is relatively constant for a homogeneous material and is relatively insensitive to extrusion velocity.

The action of the dissipator 10 of the present invention may be analyzed as follows: Let $A_1$=cross-sectional area of the billet 32 to be extruded,
$Y$=yield strength of the material to be extruded,
$V$=total volume of the material to be extruded,
$A_2$=cross-sectional area of the grooves 34 and 36 in the piston strut 22 at the smallest end thereof,
$T$=length of travel of the piston strut 22,
$v_0$=initial velocity of the mass to be decelerated, $M$ = mass to be decelerated by the dissipator 10,
$a$ = rate of deceleration desired.

The initial velocity ($v_0$) and the rate of deceleration desired ($a$) determine the length of travel (T) of the piston strut 22, given by the laws of motion as:

$$T = 1/2 v_0^2 / a \quad (1)$$

The kinetic energy of the mass to be decelerated is given by:

$$K.E. = 1/2 M v_0^2 \quad (2)$$

This energy is absorbed in the work required to extrude the material 32, which is given by:

$$\text{Work of extrusion} = \phi Y V \ln A_1/A_2 \quad (3)$$

where ln represents the logarithm to the base $e$, and $\phi$ is an emipirically determined constant (having values of the order of 1.5) which depends on other dissipative mechanisms such as friction and internal flow in the extruding material not contributing to the area reduction.

The relationship among the volume of material to be extruded (V), the length of travel of the piston strut (T), and the cross sectional area of the billet 32 to be extruded ($A_1$), is:

$$V = A_1 T \quad (4)$$

Equating the kinetic energy of the mass to be decelebrated to the work of extrusion and making appropriate substitutions of Equations 1 and 4 gives:

$$M_a = \phi Y A_1 \ln A_1/A_2 \quad (5)$$

Thus it is seen that the exact dimensions and materials used in a given single shot energy dissipator 10 of the present invention depend upon the requirements of the particular application.

In a typical example, wherein the billet 32 is of soft aluminum having a yield strength (Y) of 500 kg./cm.$^2$, a density of 2.7 g./cc., and a cross section ($A_1$) of 1 cm.$^2$, a single dissipator 10 of the present invention having an extrusion ratio ($A_1/A_2$) of 28 can be used to stop a mass of 250 kg. (approximately 500 lbs.) decelerating at a rate of 10 times the acceleration of gravity (10 $g$'s) from an initial velocity of 25 ft./sec. The said 250 kg. mass can be stopped by going from a velocity of 25 ft./sec. to zero velocity while traveling through a distance of only one foot. Thus, four such dissipators acting in parallel can decelerate a mass of about 1 ton under the same conditions.

It can be shown that the total mass of the aluminum extruded by one dissipator 10 under the above conditions will be 81 grams. Also, since the kinetic energy of the decelerated mass ultimately appears as heat in the extruded aluminum, there will be a temperature rise in the extruded aluminum of about 83° C.

To obtain a changing rate of deceleration, the billet 32 may be replaced by a composite extrusion billet 44 as shown in FIGURE 5. The composite extrusion billet 44 is made up of layers 46, 48 and 50 materials having different values of Y, so as to give the desired deceleration force as they are extruded. Thus, the type of material utilized for the extrudable material 32 can determine the deceleration of the dissipator 10 of the present invention. With a homogeneous extrudable material, the deceleration will be substantially constant. With different extrudable materials arranged as in FIGURE 5, deceleration can be varied as desired.

In FIGURE 6, there is shown a single shot energy dissipator which comprises an inverted cup-shaped container 60 which has a piston strut 62 slidably received within the open end 64 thereof. The piston strut 62 has an outer diameter substantially equal to or slightly less than the diameter of the cavity 66 of the container 60. The strut 62 has an upper face 68 and a free end 70.

The container 60 has a pair of parallel grooves 70 and 72 running the length of the container. The grooves 70 and 72 may be deeper at the open end of the container 60 than they are at the closed end thereof. Thus, the grooves 72 and 74 may taper outwardly from the axis of the container 60 from its closed end 76 toward its open end.

Within the cavity 66, between the upper face 68 of the strut 62 and closed end 76 of the cavity 66, is an extrudable mass of material 78. For example, the material 78 can be a billet of soft aluminum.

The operation of the embodiment shown in FIGURES 6 and 7 is substantially the same as that described with respect to the embodiment shown in FIGURES 2, 3 and 4. Further, the billet 78, can be replaced by a composite extrusion billet such as that shown in FIGURE 5.

Referring now to FIGURE 8, there is shown a fourth embodiment of the present invention which comprises an inverted cup-shaped container 80 which has a piston strut 82 slidably received within the open end 84 thereof. The piston strut 82 has an outer diameter substantially equal to or slightly less than the diameter of the cavity 86 of the container 80. The piston strut 82 is made from a heavy-walled tubing and has a hollow interior 88. A wall 90 is provided across the lower end of the piston 82 and provides an impact surface therefor. The upper end of the piston 82 is provided with a centrally disposed extrusion orifice 92. The extrusion orifice 92 is formed in a top wall 94 attached to the tubelike walls of the piston 82. The orifice 92 tapers outwardly from the axis of the piston 82.

A billet 96 is held within the cavity 86 between the upper wall 94 of the piston 82 and the back wall 98 of the cavity 86. The billet 96 is made from an extrudable mass of material. For example, the billet can be made from soft aluminum.

The operation of the embodiment shown in FIGURE 8 is substantially the same as that shown in the previously described embodiments. However, the billet 96 is extruded into the hollow interior 88 of the piston 82. Piston 82 has air vents 83 to permit escape of air during extrusion. The billet 96 may be replaced with a composite extrusion billet such as that which is shown in FIGURE 5.

Referring now to FIGURES 9 and 10, there is shown a fifth embodiment of the present invention which comprises a cup-shaped container 100 which has a piston strut 102 slidably received within the open end 104 thereof. Container 100 is supported by a stationary support such as the base 103 of an elevator shaft. The piston strut 102 has an outer diameter which is less than the diameter of the cavity 106 of the container 100. The piston 102 has a lower face 108 and a free end 110. The cavity 106 forms a smooth bore within the container 100.

The piston 102 is retained in a centrally disposed position within the cavity 106 by a plurality of elongated protuberances 112, 114 and 116 on the inner peripheral wall of the container 100. Within the cavity 106, between the lower face 108 of the piston 102 and the back wall 118 of the cavity 106, is an extrudable mass of material 120. For example, material 120 can be a billet of soft aluminum. The protuberances act as guide surfaces against which the piston 102 slides when it extrudes mass 120 into the arcuate passageways 124, 126 and 128 which are parallel to the longitudinal axis of container 100 and may be tapered in the same manner as described above. Instead of protuberances on the inner peripheral surface of container 100, protuberances may be provided on the outer periphery of piston 102.

The operation of the embodiment shown in FIGURES 9 and 10 is substantially the same as that described with respect to FIGURES 2, 3 and 4, except that in the present embodiment the material 120 is extruded as an arcuate sheet into passageways 124, 126 and 128 between the outer diameter of the loosely fitting piston 102 and the inner diameter of the container 100. If desired, the billet 120 can be replaced by a composite extrusion billet such as that which is shown in FIGURE 5. It will be obvious that a greater number of protuberances may be utilized.

While the extrudable material may be aluminum as described above, other metallic or non-metallic materials may be used. For example, the extrudable material may be magnesium, lead, zinc, carbon, polymeric resins, etc.

The energy dissipator of the present invention need not be attached to the article to be decelerated. It is within the scope of the present invention to attach the energy dissipator to a stationary support such as the bottom of an elevator shaft as per FIGURE 9 or on pillars at the end of a railroad track ready for emergency use to cushion the stopping of the elevator, train, or the like. While the present invention is non-continuous and therefore designed for single use, it may be re-used by replacing the billet and/or piston strut.

The present invention may be embodied in other specific forms without departing from the spirit or essential attributes thereof and, accordingly, reference should be made to the appended claims rather than to the foregoing specification as indicating the scope of the invention.

I claim:

1. A single shot energy dissipator comprising a container having a cavity therein defined by a closed end and an open end of said container, a mass of extrudable material in said cavity adjacent said closed end, a piston strut slidably disposed in said cavity extending through said open end abutting said mass, said piston strut having a longitudinally extending extrudable material passage therealong extending from the one end thereof and abutting said mass of extrudable material, and means coupling said container and mass to an article to be decelerated in a manner wherein a decelerating force can be transmitted to said container and strut along the longitudinal axis of said container cavity and said piston strut.

2. The single shot energy dissipator of claim 1 wherein said extrudable material passage includes a plurality of peripherally spaced grooves on the surface of said piston strut, said peripherally spaced grooves having substantially similar cross sections.

3. The single shot energy dissipator of claim 2 wherein said peripherally spaced grooves extend the length of said piston strut, said peripherally spaced grooves having the smallest cross section at the ends of said piston strut abutting said mass of extrudable material, said peripherally spaced grooves tapering inwardly toward the longitudinal axis of said piston strut.

4. The single shot energy dissipator of claim 1 wherein said means includes means for coupling the closed end of said container to an article.

5. The single shot energy dissipator of claim 1 wherein said extrudable material is a substantially homogeneous metal.

6. The single shot energy dissipator of claim 1 wherein said mass extrudable material is formed of layers of different extrudable materials to achieve a controlled varying deceleration.

7. A single shot energy dissipator comprising a container having a cavity therein defined by a closed end and an open end of said container, a mass of substantially homogeneous extrudable metal material in said cavity adjacent said closed end, a piston strut slidably disposed in said cavity extending through said open end and abutting said mass, one of said container and piston strut including means defining a passage into which said extrudable material can flow as it is extruded, and means supporting said container and mass so that an article may be decelerated by the transmission of a decelerating force to said container and strut along the longitudinal axis of said container cavity and said piston strut to cause said strut to extrude said mass into said passage.

8. A single shot energy dissipator comprising a container having a cavity therein defined by a closed end and an open end of said container, a mass of extrudable material formed of layers of different extrudable materials in said cavity adjacent said closed end, a piston strut slidably disposed in said cavity extending through said open end and abutting said mass, one of said container and piston strut including means defining a passage into which said extrudable material can flow as it is extruded, and means supporting said container and mass so that an article may be decelerated by the transmission of a decelerating force to said container and strut along the longitudinal axis of said container cavity and said piston strut to cause said strut to extrude said mass into said passage.

9. A single shot energy dissipator comprising a container having a cavity therein defined by a closed end and an open end of said container, a mass of extrudable material in said cavity adjacent said closed end, a hollow piston strut slidably disposed in said cavity extending through said open end and abutting said mass, one of said container and piston strut including means defining a passage into which said extrudable material can flow as it is extruded, said means defining a passage comprising an extrusion opening in the end of said piston strut abutting said mass, and means supporting said container and mass so that an article may be decelerated by the transmission of a decelerating force to said container and strut along the longitudinal axis of said container cavity and said piston strut to cause said strut to extrude said mass into said passage.

10. A single shot energy dissipator comprising a container having a cavity therein defined by a closed end and an open end of said container, a mass of extrudable material in said cavity adjacent said closed end, a piston strut slidably disposed in said cavity extending through said open end and abutting said mass, one of said container and said piston strut including means defining a passage into which said extrudable material can flow as it is extruded, said passage increasing in cross-sectional area from the end of said strut abutting said mass toward the end of said strut remote from said mass, and means supporting said container and mass so that an article may be decelerated by the transmission of a decelerating force to said container and strut along the longitudinal axis of said container cavity and said piston strut to cause said container to extrude said mass into passage.

11. A single shot energy dissipator, comprising a container having a cavity therein defined by a closed end and an open end of said container, a mass of extrudable material in said cavity adjacent said closed end, a piston strut slidably disposed in said cavity extending through said open end and abutting said mass, one of said container and piston strut including means defining a passage into which said extrudable material can flow as it is extruded, said passage defining means including at least one protuberance on one of said container and strut, and means supporting said container and mass so that an article may be decelerated by the transmission of a decelerating force to said container and strut along the longitudinal axis of said container cavity and said piston strut to cause said strut to extrude said mass into said passage.

12. A single shot energy dissipator in accordance with claim 11 wherein said strut and container are circular in cross-section, and said passage being arcuate in cross section.

13. A single shot energy dissipator comprising a container having a cavity therein defined by a closed end and an open end of said container, a mass of substantially homogeneous extrudable metal material within said cavity adjacent said closed end, a piston strut slidably disposed in said cavity extending through said open end and abutting said mass, said container and said piston strut defining a passage into which the extrudable material can flow as it is extruded and stationary means supporting said container and mass for decelerating an article in a manner wherein a decelerating force can be transmitted to said supporting means along the longitudinal axis of said container and said piston strut.

14. A single shot energy dissipator comprising a container having a cavity therein defined by a closed end and an open end of said container, a mass of extrudable material in said cavity adjacent said closed end, said mass of extrudable material being formed of layers of different extrudable materials, a piston strut slidably disposed in said cavity extending through said open end and abutting said mass, said container and said piston strut defining a passage into which said extrudable material can flow as it is extruded, and stationary means supporting said container and mass for decelerating an article in a manner wherein a decelerating force can be transmitted to said supporting means along the longitudinal axis of said container and said piston strut.

15. A single shot energy dissipator comprising a container having a cavity therein defined by a closed end and an open end of said container, a mass of substantially homogeneous extrudable metal material in said cavity adjacent said closed end, a piston strut slidably disposed in said cavity extending through said open end and abutting said mass, and said container and said piston strut defining a passage into which said extrudable material can flow as it is extruded.

16. A single shot energy dissipator comprising a container having a cavity therein defined by a closed end and an open end of said container, a mass of extrudable material within said cavity adjacent said closed end, said mass of extrudable material being formed of layers of different extrudable materials, a piston strut slidably disposed in said cavity extending through said open end and abutting said mass, and said container and said piston strut defining a passage into which said extrudable material can flow as it is extruded.

References Cited by the Examiner
UNITED STATES PATENTS

| | | | |
|---|---|---|---|
| 2,994,524 | 8/61 | Jarret et al. | |
| 2,997,325 | 8/61 | Peterson | 188—102 X |
| 3,053,526 | 9/62 | Kendall | 188—101 X |

MILTON BUCHLER, *Primary Examiner.*

DUANE A. REGER, *Examiner.*